(12) United States Patent
Nason et al.

(10) Patent No.: US 9,906,426 B2
(45) Date of Patent: Feb. 27, 2018

(54) METHOD OF ACCELERATING CONTROL LINK LOSS DETECTION

(75) Inventors: Christopher James Nason, Kanata (CA); Robert Star, Kanata (CA)

(73) Assignee: MITEL NETWORKS CORPORATION, Ottawa (CA)

( * ) Notice: Subject to any disclaimer, the term of this patent is extended or adjusted under 35 U.S.C. 154(b) by 2043 days.

(21) Appl. No.: 11/674,771

(22) Filed: Feb. 14, 2007

(65) Prior Publication Data

US 2007/0206583 A1 Sep. 6, 2007

(30) Foreign Application Priority Data

Feb. 17, 2006 (EP) ..................................... 06110115

(51) Int. Cl.
*H04L 12/66* (2006.01)
*H04L 12/26* (2006.01)
(52) U.S. Cl.
CPC .......... *H04L 43/10* (2013.01); *H04L 43/0811* (2013.01)
(58) Field of Classification Search
CPC .............................. H04L 43/10; H04L 43/0811
USPC .................................. 370/242, 248, 352–356
See application file for complete search history.

(56) References Cited

U.S. PATENT DOCUMENTS

| 5,355,484 A | * | 10/1994 | Record et al. | 717/127 |
|---|---|---|---|---|
| 6,430,150 B1 | * | 8/2002 | Azuma et al. | 370/218 |
| 6,584,502 B1 | | 6/2003 | Natarajan et al. | |
| 6,914,877 B1 | * | 7/2005 | Alamineh | 370/217 |
| 6,970,451 B1 | * | 11/2005 | Greenberg et al. | 370/352 |
| 2003/0217135 A1 | * | 11/2003 | Chatani et al. | 709/223 |
| 2004/0208186 A1 | * | 10/2004 | Eichen et al. | 370/401 |

* cited by examiner

*Primary Examiner* — Luat Phung

(57) ABSTRACT

A method of accelerating link loss detection includes providing a plurality of IP devices in communication with a central server. The method includes: a first one of the plurality of IP devices broadcasting a link loss message to others of the plurality of IP devices when communication between the first one of the plurality of IP devices and the central server is interrupted, one of the others of the plurality of IP devices performing a verification process to confirm interruption of communication between the central server and the plurality of IP devices and upon successful completion of the verification process, the one of the others of the plurality of IP devices broadcasting a link loss confirmation message and each of the IP devices terminating communication with the central server and reconnecting to a new central server following receipt of the link loss confirmation message.

10 Claims, 8 Drawing Sheets

METHOD OF ACCELERATING CONTROL LINK LOSS DETECTION

FIELD OF THE INVENTION

The present invention relates to communications systems, in particular, to a Private Branch Exchange (PBX) network having a method of accelerating control link loss detection.

BACKGROUND OF THE INVENTION

Stimulus Internet Protocol (IP) phones differ from Time Division Multiplexing (TDM) based phones in that a breach in the communications link to the PBX is not known immediately. Most stimuli based IP phones use a "keepalive" scheme that requires one endpoint to periodically send a message across a control link to the other. The absence of the message when expected, or the absence of a response, inform the endpoint that the control link is no longer active. The state of the art in keepalive schemes is to use Transmission Control Protocol (TCP) layer keepalives, application layer keepalives, which are also known as "heartbeats", or PINGs. These methods generally entail a messaging burden upon the PBX. The exception is when the PBX uses a multicast or broadcast heartbeat scheme. However, these schemes are problematic in that broadcasts are isolated to specific subnets, and multicast may not reach to other subnets on all networks, as some routers in the field do not support Internet Group Management Protocol (IGMP).

Some networks support a control link loss scheme that requires bidirectional application layer messaging. In this type of scheme, the administrator configures the IP phone poll and the heartbeat time periods to suit the needs of the network. The PBX sends each phone the information in a "Configure Link Management" control message which enables the feature in the phones. The PBX will expect to see a control message every poll period from each IP phone and each IP phone will expect to see a control message from the PBX every heartbeat period. If either side finds that the poll or heartbeat is absent, the control link can be torn down and data structures re-initialized. Alternatively, the phone can re-home to a new PBX.

The size of PBXs continues to grow, with increasing numbers of phones being supported by each PBX. If the control link between the PBX and a phone is lost for any reason, the phone loses its ability to make and receive calls. It is therefore desirable to shorten link loss discovery times in order to ensure that users are provided with timely availability of phone service. Shortening link loss discovery times by increasing the volume and/or frequency of messages sent between the PBX and the IP phones may be cumbersome to the PBX. Therefore, a solution for shortening link loss discovery times while not increasing the volume and/or frequency of messages is desirable.

SUMMARY OF THE INVENTION

In one aspect of the present invention there is provided a method of accelerating link loss detection. The method includes providing a plurality of IP devices in communication with a central server. When one of the plurality of IP devices discovers that communication between the first one of the plurality of IP devices and the central server is interrupted, it broadcasts a link loss message to others of the plurality of IP devices. One of the others of the plurality of IP devices then performs a verification process to confirm interruption of communication between the central server and the plurality of IP devices. If the verification process is successful, the one of the others of the plurality of IP devices broadcasts a link loss confirmation message and each of the IP devices terminates communication with the central server and reconnects to a new central server following receipt of the link loss confirmation message. If the verification process is unsuccessful, the IP devices resume normal operation.

In a further aspect of the present invention there is provided a network among a plurality of IP devices operable to communicate with a central server, the network comprising a plurality of IP devices for broadcasting a link loss message to other IP devices when communication between the plurality of IP devices and the server is interrupted, and a plurality of IP devices for performing a verification process to confirm interruption of communication between the server and the plurality of IP devices and broadcasting a server unavailable message if the verification process is unsuccessful, wherein each of the plurality of IP devices terminates communication with the server and reconnects to a new central server in response to receipt of the server unavailable message.

BRIEF DESCRIPTION OF THE DRAWINGS

The invention will be better understood with reference to the following Figures in which like numerals denote like parts and in which.

DETAILED DESCRIPTION OF THE PREFERRED EMBODIMENTS

In an embodiment of the present invention described in greater detail below, a subnet of IP phones communicate with a central server, or PBX, to provide a PBX network. The PBX sends a Configure Link Management Parameters (CLMP) message to each IP phone upon connection of the IP phone to the PBX. The CLMP message includes link detection timer values for use with a heartbeat and poll scheme in which the PBX expects to receive a control message every poll period from each IP phone and each IP phone expects to receive a "keepalive" control message from the PBX every heartbeat period. The CLMP message further includes a 32 byte encryption key and a 16 byte initialization vector (IV). Since the connection between the PBX and the IP phone is already secure, the keys may be passed in the CLMP message.

Each IP phone in the subnet maintains a list of addresses of PBXs with which it may establish a connection. If the IP phone is unable to connect to the first PBX on its list, it will then attempt to connect to the next PBX address on its list until a connection is established. If the IP phone has attempted to connect to every PBX address on its list without success, the IP phone restarts at the beginning of the list.

Figure 1:
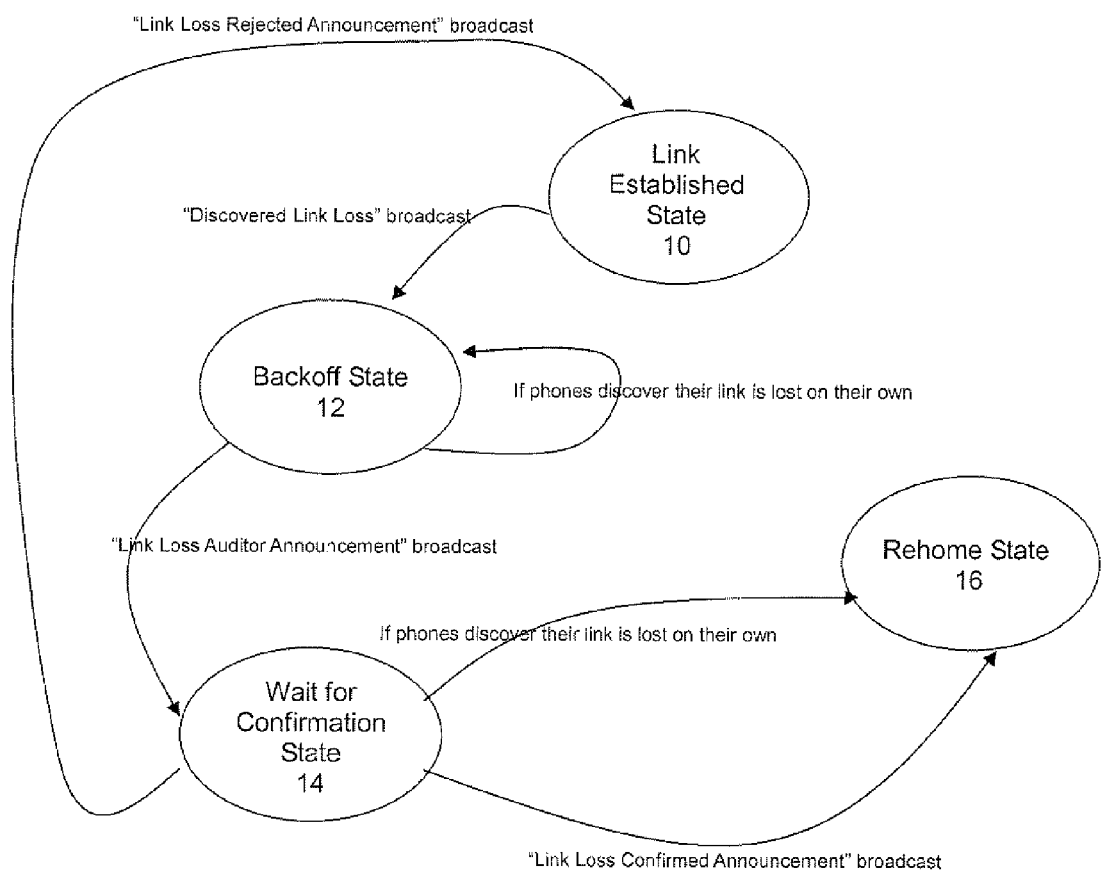
FIG. 1 is a state diagram showing the interrelationship between operating states for IP phones, according to a preferred embodiment of the invention.

Each IP phone is capable of operating in a link established state 10, a backoff state 12, a wait for confirmation state 14 and a re-home state 16. The relationship between these states is generally outlined in FIG. 1.

Figure 2:
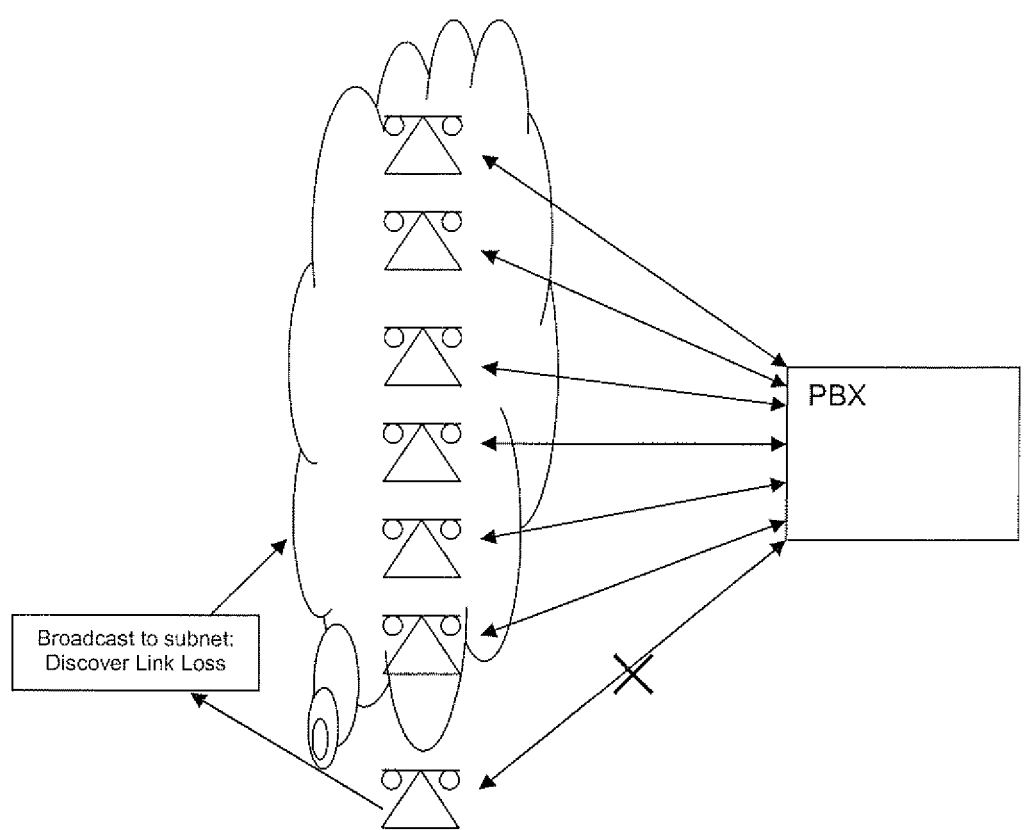
FIG. 2 is a schematic diagram of a plurality of IP phones connected to a PBX, wherein one of the IP phones that discovers a link loss and broadcasts a message, according to the preferred embodiment.
Figure 3:
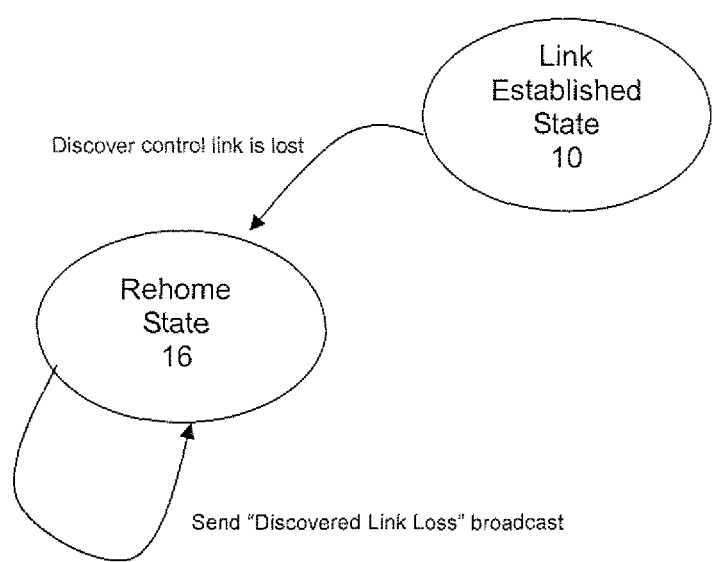
FIG. 3 is a state diagram showing state transitions for the IP phone of FIG. 2 that discovers a link loss.

Referring also to FIG. 2, if an IP phone operating in the link established state 10 discovers that it has not received a keepalive message from the PBX at the expected interval, it will broadcast a "Discovered Link Loss" message to all IP phones in its subnet. The "Discovered Link Loss" message includes the PBX IP address for validation purposes and the phone's IP address and MAC (Media Access Control) address for logging purposes. The message will further be encrypted using the encryption key and initialization vector (IV) received by all IP phones upon connection to the PBX. Following broadcast of the "Discovered Link Loss" message, the IP phone that sent the message will disconnect its control socket with the PBX and enter the re-home state 16, as shown in FIG. 3. In the re-home state, the IP phone discovers and reconnects to the next PBX on its list.

Figure 4:
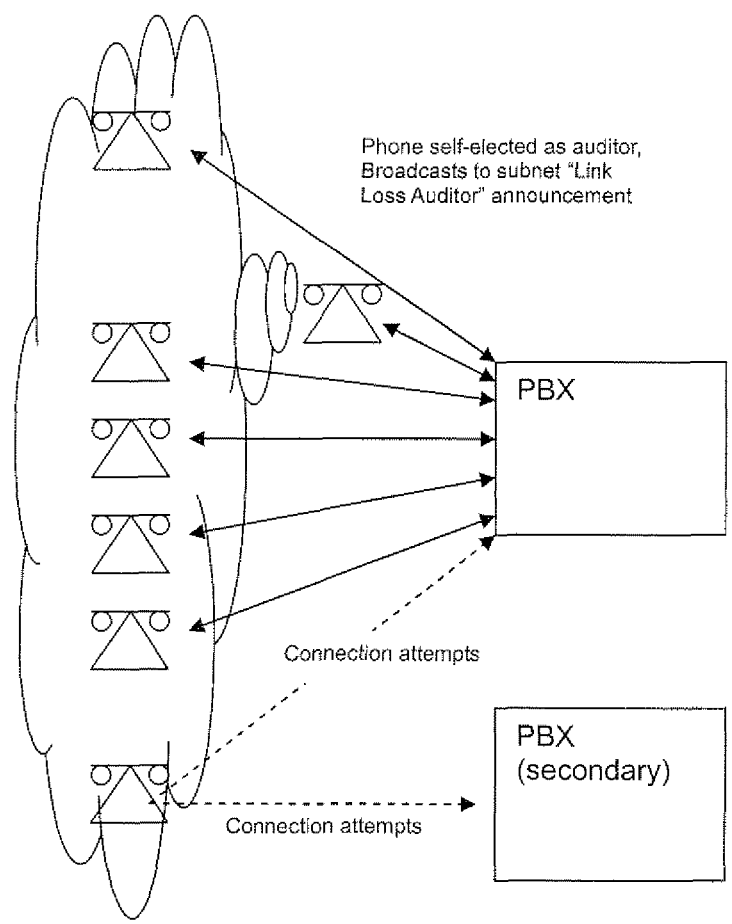
FIG. 4 is a schematic diagram of a plurality of IP phones connected to a PBX, wherein one of the IP phones elects itself to be an auditor, according to the preferred embodiment.

The IP phones that receive the "Discovered Link Loss" message decrypt the message and verify that the PBX IP address is correct. The IP phones then enter the backoff state 12 for a random period of time (preferably with 10 ms granularity). All of the IP phones in the subnet receive the "Discovered Link Loss" message simultaneously and the first IP phone to complete its random backoff period becomes an auditor. Referring to FIG. 4, the auditor then broadcasts an encrypted "Link Loss Auditor Announcement" to the subnet to inform the other IP phones that it will verify the link loss. Once the IP phones receive the "Link Loss Auditor Announcement" from the auditor, they enter the wait for confirmation state 12.

Figure 5:
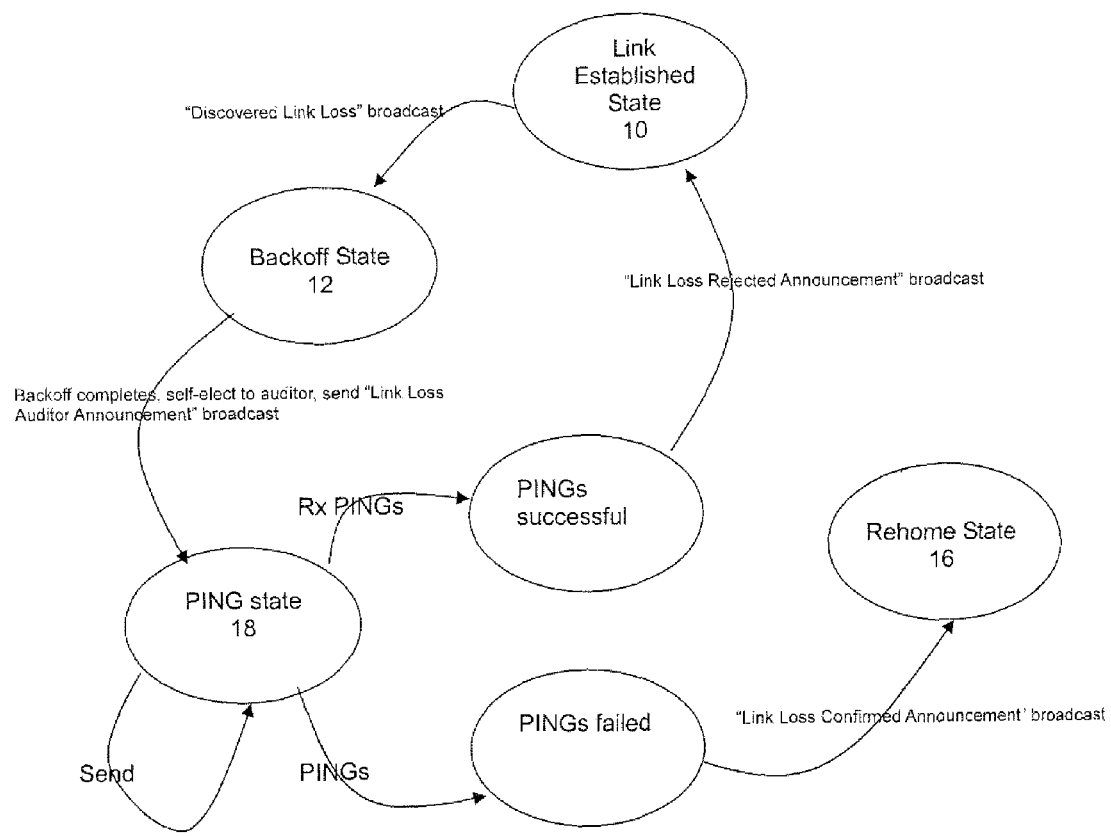
FIG. 5 is a state diagram showing state transitions for the IP phone of FIG. 4 that becomes an auditor.
Figure 6:
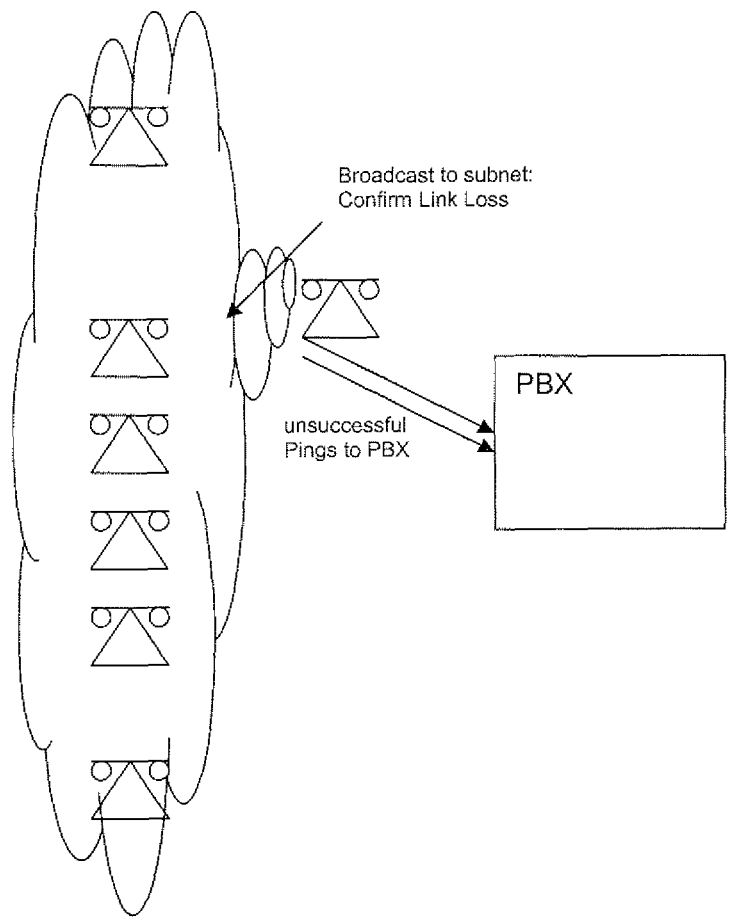
FIG. 6 is a schematic diagram similar to FIG. 4 wherein an auditor confirms that a PBX is unavailable.
Figure 7:
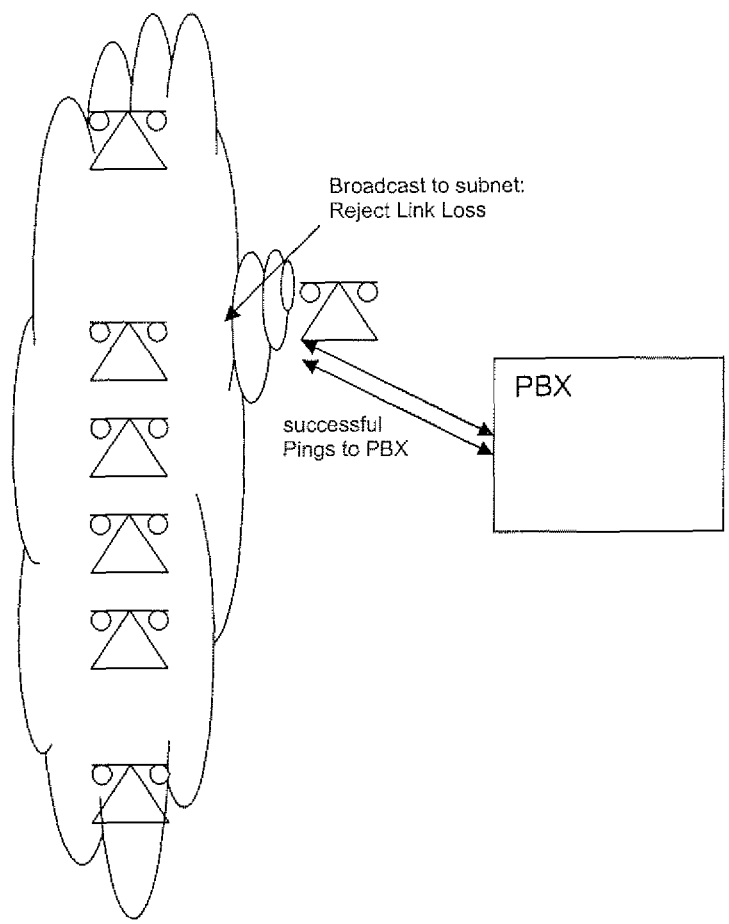
FIG. 7 is a schematic diagram similar to FIG. 6 wherein the auditor finds that a PBX is available.

Referring to FIG. 5, a verification process is performed in which the auditor enters a PING state 18 and PINGs the PBX one or more times with a maximum timeout of Pmax for each PING. Pmax is generally given a value of 1, however, may alternatively be given a different value. In addition, the auditor may PING the PBX one time or multiple times. Depending on the results of the PINGs, the auditor may either send out an encrypted "Link Loss Confirmed Announcement" broadcast, as shown in FIG. 6, or a "Link Loss Rejected Announcement" broadcast, as shown in FIG. 7.

If the IP phones receive a "Link Loss Confirmed Announcement" broadcast, each IP phone disconnects its control socket and enters the re-home state 16 in which it discovers and reconnects to another PBX. However, if the IP phones receive a "Link Loss Rejected Announcement", they resume normal operation, which includes being available to make and receive calls.

Referring back to FIG. 1, it is possible that an IP phone will be in its backoff state and discover that it no longer has a control link with the PBX. In this case, the IP phone is expected to continue to backoff until it or another IP phone announces that it is self-elected as "link loss" auditor This delay does not add much to the link loss discovery time and ensures that the potential auditor pool remains fixed. If an IP phone discovers that it no longer has a control link with the PBX when in the wait for confirmation state 14, the IP phone may re-home immediately.

The maximum link loss discovery time, which is also referred to as maximum overhead, is calculated by adding the maximum backoff interval, Bmax, to the maximum PING timeout period, 2*Pmax. The IP phones will discover that their control link is lost within [Bmax+2Pmax+(t/n)] seconds, assuming a keepalive rate of "t" seconds uniformly distributed over "n" IP phones. For example, for a random backoff spread of 0-3.0 seconds and a maximum PING timeout period of 1 second, the phones will discover that they have lost their connection to the PBX within [3+2+(t/n)] seconds. Therefore, increasing the number of IP phones "n" decreases the link loss discovery time. By contrast, in a traditional scheme, the IP phones discover that the control link is lost within "t" seconds regardless of the number of IP phones.

Operation of a client/server network, which includes IP phones A to H and IP phone X, will now be described with reference to FIG. 8. At time 0, IP phone X detects that its TCP link to the PBX is down and broadcasts the "Discovered Link Loss" message to the other IP phones. As shown, the other IP phones are still waiting to receive their next heartbeat from the PBX. Upon receiving the broadcast, all of the IP phones randomly backoff. The IP phone that completes its backoff first becomes the self-elected auditor. In this example, the auditor is phone H. Phone H then sends out a "Link Loss Auditor Announcement" to the remaining IP phones to announce that it has elected itself as the link loss auditor and will confirm that the PBX is unavailable. The other IP phones then enter the wait for confirmation state 14. Phone H confirms that the PBX is not available in a manner that has been previously described and sends out the "Link Loss Confirmed Announcement" message to the other IP phones. The other IP phones immediately disconnect their respective sockets and begin re-homing to the next PBX on their respective PBX lists.

During the random backoff interval, phone F discovers that it has lost its control link to the PBX. Since phone F is in the backoff state 12, it waits until an auditor has been elected before re-homing. Phones D and B discover that they have lost their control links to the PBX during the wait for confirmation state 14. As such, phone D and phone B immediately disconnect their sockets and re-home to the next PBX on their respective lists.

Figure 8:
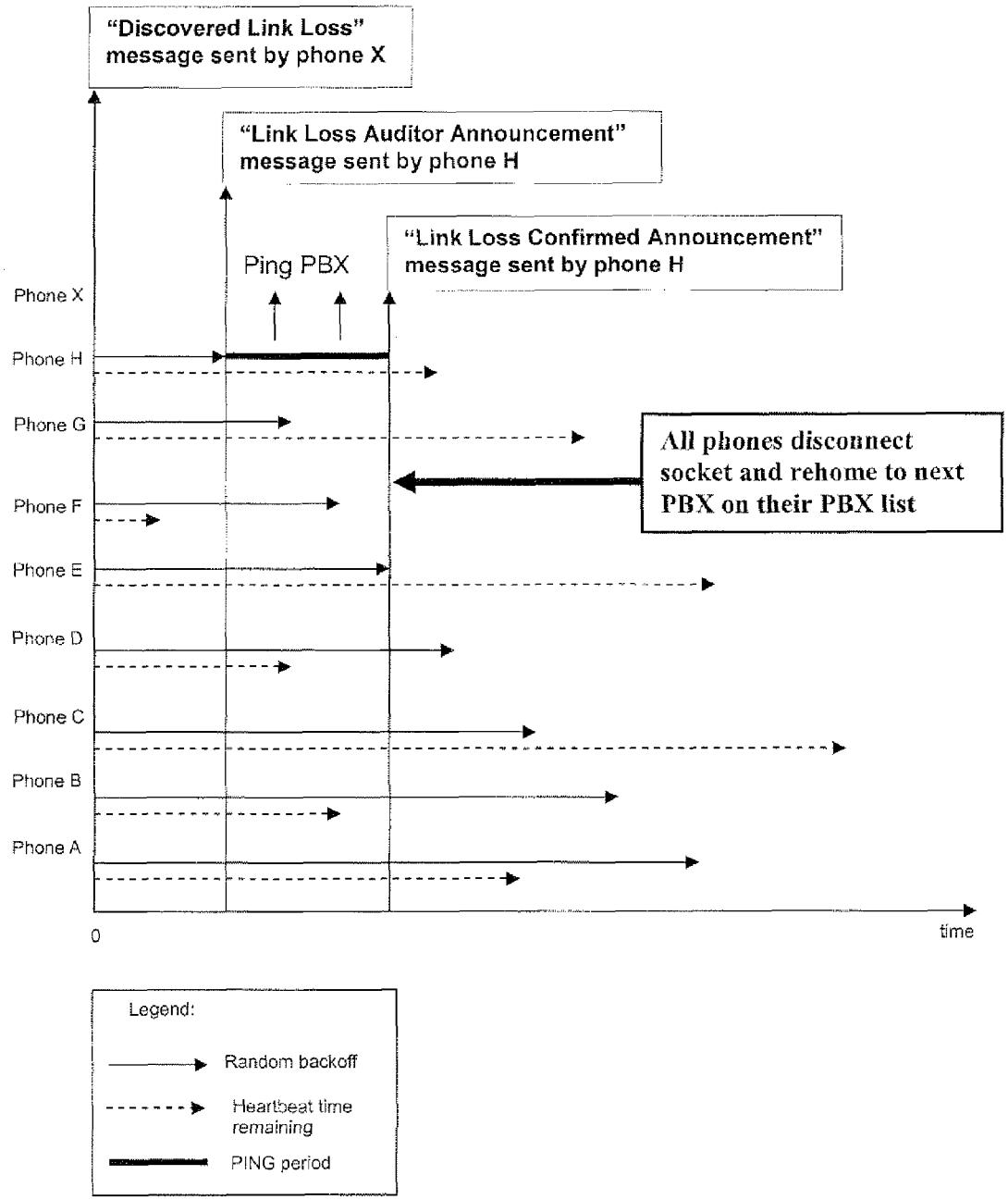
FIG. 8 is a timing diagram showing operation following discovery of a link loss according to the preferred embodiment.

In the example of FIG. 8, the auditor confirmed that the link had been lost. If the link loss was not confirmed, phone H would have sent a "Link Loss Rejected Announcement" message and the IP phones would resume normal behavior.

A specific embodiment of the present invention has been shown and described herein. However, modifications and variations may occur to those skilled in the art. Other modifications and variations may occur to those skilled in the art. All such modifications and variations are believed to be within the sphere and scope of the present invention.

What is claimed is:

1. A method for detecting an unavailable server in a network including a plurality of IP devices, said method comprising:
   providing said plurality of IP devices, each of said IP devices being in communication with a central server;
   a first one of said plurality of IP devices broadcasting a server unavailable message simultaneously to all others of said plurality of IP devices when communication between said first one of said plurality of IP devices and said central server is interrupted;

one of said others of said plurality of IP devices performing a verification process to confirm interruption of communication between said central server and said plurality of IP devices; and upon successful completion of said verification process, said one of said others of said plurality of IP devices broadcasting a server unavailability confirmation message and each of said IP devices terminating communication with said central server and reconnecting to a new central server following receipt of said server unavailability confirmation message;

wherein upon unsuccessful completion of said verification process, each of said IP devices resumes normal operation.

2. A method as claimed in claim 1, wherein said IP devices are IP phones.

3. A method as claimed in claim 1, wherein said verification process includes pinging said central server.

4. A method as claimed in claim 1, further comprising others of said plurality of IP devices performing a random backoff following receipt of said server unavailability message.

5. A method as claimed in claim 4, wherein said one of said others of said plurality of IP devices completes said random backoff first.

6. A method as claimed in claim 5, wherein said one of said others of said plurality of IP devices broadcasts a server unavailability auditor announcement following completion of said random backoff.

7. A method as claimed in claim 1, wherein each of said plurality of IP devices is in a wait for confirmation state while said one of said others of said plurality of IP devices performs said verification process.

8. A method as claimed in claim 1, wherein said first of said plurality of IP devices terminates communication with said central server and reconnects to a new central server following broadcast of said server unavailability message.

9. An IP device operating in a subnet of IP devices and each IP device operable to communicate with a central server, comprising:
   receiving a server unavailability message simultaneously with others of IP devices in the subnet from another IP device in the subnet and in communication with the central server;
   verifying interruption of communication of said another IP device with said central server following receipt of said server unavailability message; and
   broadcasting messages to all other IP devices in the subnet in communication with the central server;
   the IP device being arranged to:
   upon successful completion of said verification process, broadcast to said all other IP devices in the subnet a server unavailability confirmation message, terminate communication with said central server and reconnect to a new central server; and
   upon unsuccessful completion of said verification process, broadcast to said all other IP devices a server unavailability confirmation message and resume normal operation.

10. A network comprising:
   a central server; and
   a plurality of IP devices in communication with said central server;
   wherein said plurality of IP devices includes:
   a first IP device operable to, when communication with said central server is interrupted, broadcast a server unavailability message simultaneously to all others of said plurality of IP devices and reconnect to a new central server;
   a second IP device, according to claim 9; and
   one or more other IP devices;
   wherein each of said one and to reconnect to a new central server in response to receipt of said unavailability confirmation message.

* * * * *